(12) United States Patent
Sedarat et al.

(10) Patent No.: US 12,334,965 B1
(45) Date of Patent: Jun. 17, 2025

(54) NARROWBAND CANCELLATION FOR RECEIVED SIGNAL

(71) Applicant: Ethernovia Inc., San Jose, CA (US)

(72) Inventors: Hossein Sedarat, San Jose, CA (US); Ramin Shirani, Morgan Hill, CA (US); Roy T. Myers, Jr., Morgan City, CA (US); Darren S. Engelkemier, Menlo Park, CA (US)

(73) Assignee: Ethernovia Inc., San Jose, CA (US)

( * ) Notice: Subject to any disclaimer, the term of this patent is extended or adjusted under 35 U.S.C. 154(b) by 682 days.

(21) Appl. No.: 17/721,020

(22) Filed: Apr. 14, 2022

Related U.S. Application Data

(60) Provisional application No. 63/188,231, filed on May 13, 2021.

(51) Int. Cl.
  *H04B 1/10* (2006.01)
  *H04B 1/04* (2006.01)

(52) U.S. Cl.
  CPC ... *H04B 1/1036* (2013.01); *H04B 2001/0433* (2013.01); *H04B 2001/0441* (2013.01)

(58) Field of Classification Search
  CPC .......... H04B 1/1036; H04B 2001/0433; H04B 2001/0441
  See application file for complete search history.

(56) References Cited

U.S. PATENT DOCUMENTS

| | | |
|---|---|---|
| 2015/0215138 A1* | 7/2015 | Dorman ............ H04L 25/03076 375/233 |
| 2016/0241422 A1* | 8/2016 | Akita ................. H04L 25/03146 |
| 2017/0201276 A1* | 7/2017 | Pandey .................... H04B 3/23 |
| 2021/0218604 A1* | 7/2021 | Wu .................... H04L 25/03031 |
| 2021/0288656 A1* | 9/2021 | Ganesan ............. H03M 1/1215 |

\* cited by examiner

*Primary Examiner* — San Htun
(74) *Attorney, Agent, or Firm* — Schwegman, Lundberg & Woessner, P.A.

(57) ABSTRACT

Various embodiments described herein provide for narrowband cancellation for a signal received at a receiver in a communication system. In particular, some embodiments implement a narrowband canceller (NBC) that is configured to cancel a narrowband signal from a transmitted signal that is received by a first physical layer device from a second physical layer device over a communication medium.

20 Claims, 9 Drawing Sheets

NARROWBAND CANCELLATION FOR RECEIVED SIGNAL

CROSS-REFERENCE TO RELATED APPLICATION

This application claims priority to and the benefit of U.S. Provisional Patent Application No. 63/188,231, filed on May 13, 2021, which is incorporated herein by reference.

TECHNICAL FIELD

Embodiments described herein relate to data communications and, more particularly, to systems, methods, devices, and instructions for narrowband cancellation for a signal received at a receiver in a communication system.

BACKGROUND

Network-based communication, such as that based on Ethernet physical layer standards, often has to deal with noise or interference due to various sources in an environment. An example of this is electromagnetic interference (EMI) from radio frequency (RF) sources, which is particularly problematic for network-based communication in automotive environments. Unlike other sources of interference, such as thermal noise, nonlinearities, impulse noise, and alien crosstalk, EMI spectrum is a narrowband interference (NBI) in frequency domain and is highly correlated in time domain (e.g., if we observe some samples of NBI, the next sample of NBI is very predictable). NBI can be in-band (e.g., below Nyquist frequency) or out-of-band (e.g., above Nyquist frequency) with the signal being transmitted from a transmitter to a receiver. While out-of-band NBI can be addressed (e.g., blocked or mitigated) by anti-aliasing low-pass filters (e.g., analog lowpass filter, digital filter, etc.), in-band NBI cannot be addressed as easily. For example, a stop-band filter centered around frequency of the transmitted signal cannot by itself block or mitigate in-band NBI because inter-symbol interference (ISI) from the stop-band filter can be a limiting factor.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
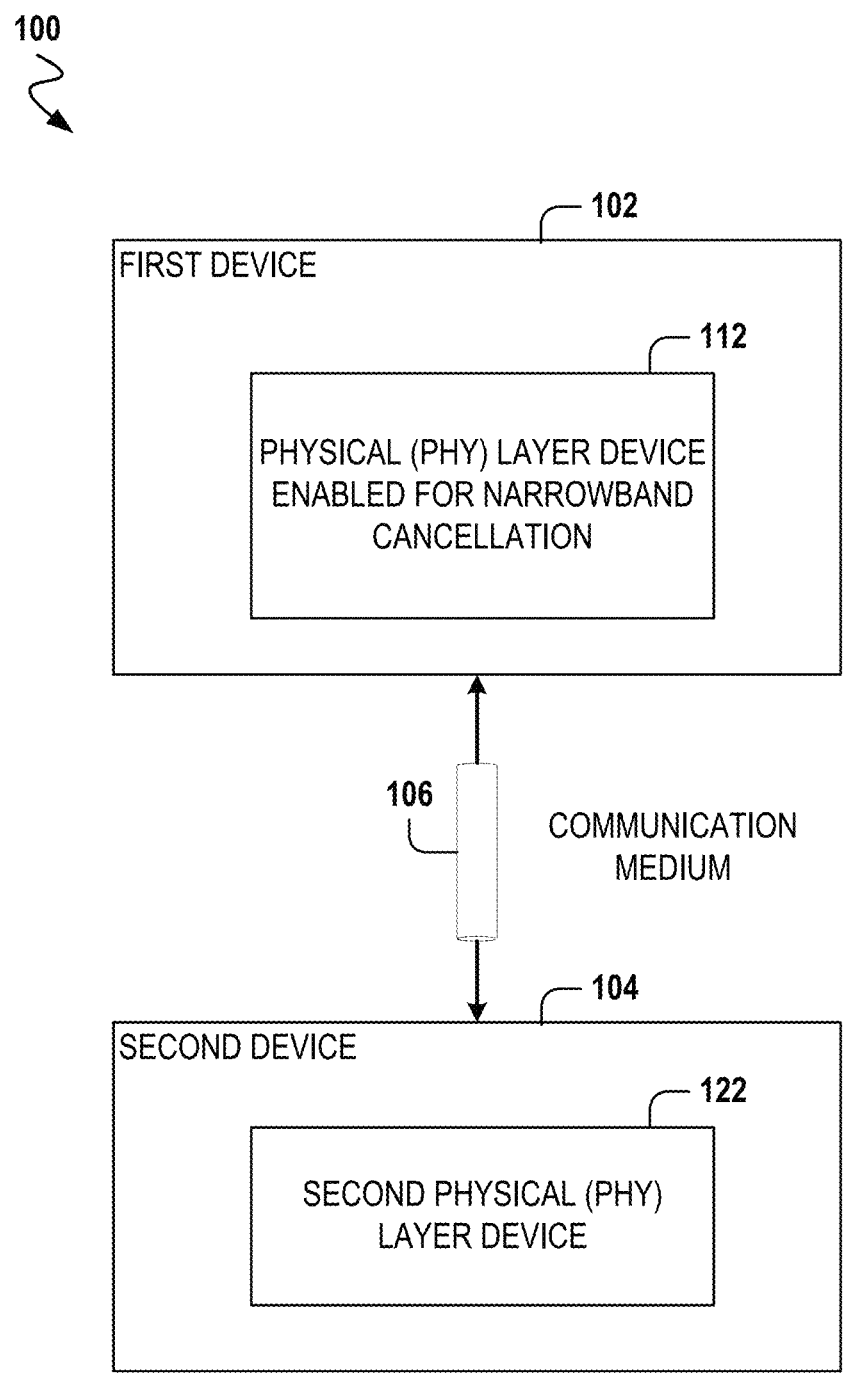
FIG. 1 is a block diagram illustrating an example system that comprises physical (PHY) layer devices, any of which can use of narrowband cancellation to cancel a narrowband signal in a received signal, in accordance with some embodiments.

Various embodiments described herein provide for narrowband cancellation for a signal received at a receiver in a communication system. In particular, some embodiments described herein implement a narrowband canceller (NBC) that is configured to cancel (e.g., reject or otherwise remove) a narrowband signal from a transmitted signal that is received by a first physical layer device from a second physical layer device over a communication medium. By using various embodiments described herein, physical layer (or physical layer device) for networking applications, such as automotive networking applications and the like, can implement a narrowband cancellation with respect to a signal received at a receiver (e.g., a receiving PHY) from a transmitter (e.g., a transmitting PHY).

Depending on the embodiment, the narrowband signal can comprise a narrowband interference (NBI), which can be very low frequency (e.g., close to direct current (DC)), very high frequency (e.g., close to Nyquist), or somewhere in between. Additionally, NBI is not necessarily static and can experience changes or variations over time. For instance, an embodiment described herein can implement an NBC comprising a long, adaptive finite impulse response (FIR) filter, which can cancel interference (e.g., electromagnetic interference (EMI)) sources with one or more frequencies not too close to DC and Nyquist. An embodiment can implement an NBC that operates as a baseline wander canceller, which can cancel very low frequency NBI. An embodiment can implement an NBC that operates as a very high-frequency demodulating system, which can reject NBI that is close to Nyquist frequency. Additionally, an embodiment can implement a single NBC that can be configured to perform a combination of two or more operations (such as those above) within a physical layer device that receives a transmitted signal from another physical layer device over a communication medium (e.g., a data transmission medium for transmitting a data signal).

According to various embodiments, a Narrowband Canceller (NBC) operates by: receiving as input a residual detection error in a sample (e.g., error samples) of a received signal (e.g., received signal after feed-forward and feed-back equalization and echo cancellation); determining an estimated or predicted frequency value of a narrowband interference (e.g., electro-magnetic interface (EMI)) currently in the received signal; and based on that estimated/predicted frequency value, generating a narrowband cancellation signal to cancel (e.g., reject or remove) the narrowband interference at an input of a data sampler (e.g., data slicer). In this way, the NBC of some embodiments can act as a predictor that predicts, based on a collection (e.g., history) of previous error samples, a frequency value of a narrowband interference (NBI) in the received signal. For various embodiments, NBI is highly correlated (in the time domain) and this high correlation enables the NBI to be predictable for a next received signal based on previous error samples. Accordingly, the high correlation of NBI enables the NBC to generate a narrowband cancellation signal that can be applied to the next received signal (e.g., next incoming signal), which can effectively cancel the NBI from the next received signal prior to it reaching a data sampler.

For some embodiments, the NBC functions as a narrowband filter that blocks everything in-band except for a signal at the predicted frequency of the NBI. In various embodiments, the frequency response can be ideally zero in every frequency except at NBI, where the gain is unity and phase is zero.

The design and implementation of the NBC can vary between different embodiments. For instance, an NBC of an embodiment can be implemented as a long-term predictor or as a short-term predictor. The longer the term of predictor, the more error samples the NBC collects (e.g., accumulates) over a period of time to render a prediction, and the narrower band filter implemented by the NBC. This results in more accurate cancellation of NBI by the NBC, which can prevent other error sources from leaking into the NBC. The shorter the term of predictor, the less error samples the NBC collects over a period of time to render a prediction, and the wider band filter implemented by the NBC. While this can render the NBC less accurate, the shorter the term of the predictor, the more agile the NBC can be to changes or variations in an NBI. Additionally, while an NBC that implements a long-term predictor can be more accurate, such an NBC can be more complex and can consume more power than an NBC that implements a short-term predictor.

Depending on the embodiment, an NBC can be implemented using a finite impulse response (FIR) filter, which can be adaptive or non-adaptive (e.g., static). The NBC can operate based on no knowledge of a frequency of an NBI, or can operate based on a priori knowledge of the frequency of the NBI. The NBC can be implemented using a bandpass filter (BPF), such as a bandpass infinite impulse response (IIR) filter. An example of this is illustrated and described with respect to FIG. 4. The NBC can implement a baseline wander canceller. The NBC can be implemented using baseband cancellation. An example of this is illustrated and described with respect to FIG. 5. Additionally, the NBC can be configured to handle cancellation of very low frequency NBI (e.g., frequencies close to DC), to handle, very high frequency NBI (e.g., frequencies close to Nyquist), or NBI with a frequency that is neither very high or very low frequency (e.g., mid-frequency NBI), or some combination thereof. Examples of handling very low frequency NBI and very high frequency NBI are illustrated and described with respect to FIG. 6.

Some embodiments provide for a multi-purpose or multi-modal NBC (e.g., configurable or complex NBC), which can implement two or more methods or purposes described herein. For instance, each method/purpose implemented by an NBC can have its own signal path within the NBC (e.g., each different path comprises its own set of filters in the NBC). For instance, one path can comprise a long adaptive FIR for cancelling NBI with frequencies that are not too close to DC and Nyquist, another path can comprise one or more components (e.g., filters) that implement a baseline wander canceller for canceling very low frequency NBI that is close to DC, and yet another path can comprise one or more components (e.g., filters) for demodulating and canceling very high-frequency NBI sources that is close to Nyquist frequency. Depending on the embodiment, multiple methods/purposes can be enabled within the NBC at the same time.

By using various embodiments, physical layers for networking applications, such as automotive networking applications and the like, can implement a narrowband cancellation with respect to a signal received at a receiver (e.g., a receiving PHY) from a transmitter (e.g., a transmitting PHY).

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram illustrating an example system 100 that comprises a first physical (PHY) layer device 112 and a second physical (PHY) layer device 122, either of which can use of narrowband cancellation to cancel a narrowband signal (e.g., NBI) in a received signal (e.g., received data signal), in accordance with some embodiments. As shown, the first physical layer device 112 is part of a first device 102, and the second physical layer device 122 is part of a second device 104. The first physical layer device 112 represents one or more components of the first device 102 that implement or enable a PHY layer of a network stack of the first device 102, while the second physical layer device 122 represents one or more components of the second device 104 that implement or enable a PHY layer of a network stack of the second device 104. A communication medium 106 operatively couples the first device 102 to the second device 104, where the communication medium 106 can support a data link between the first device 102 and the second device 104. The communication medium 106 can comprise a wire (e.g., twisted pair) that permits transmission of an analog signal. Depending on the network application, different types of data payload can be transmitted from one physical layer device to another physical layer device over the communication medium 106. For instance, within an automotive network application, received data payload (e.g., within a data frame) can carry video data or sensor data for a vehicle.

Figure 9:
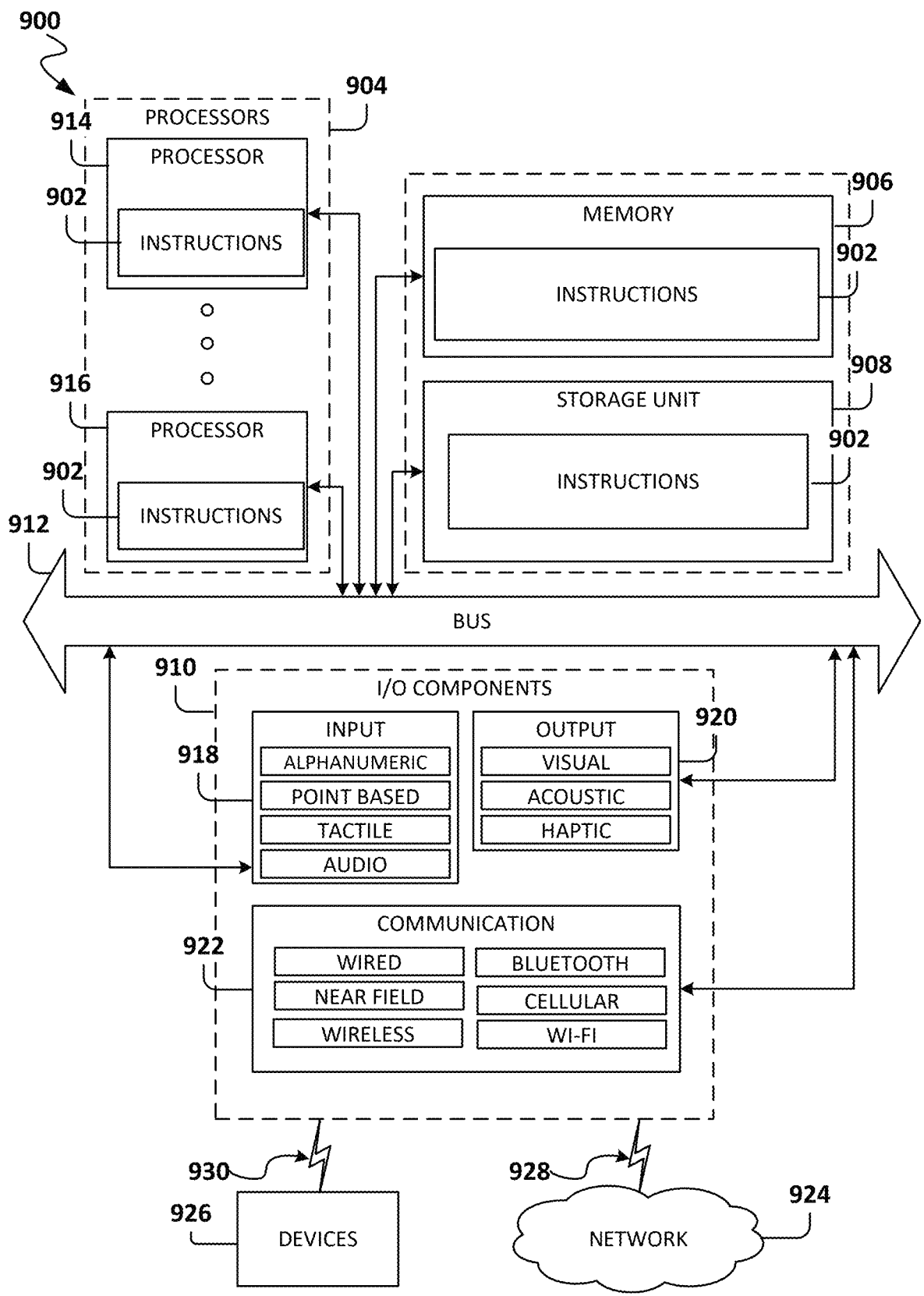
FIG. 9 is a block diagram illustrating components of an example machine that can use one or more embodiments discussed herein.

Depending on the embodiment, the first device 102 can be implemented (at least in part) by machine 900 of FIG. 9, and the second device 104 can be implemented (at least in part) by machine 900 of FIG. 9. As shown, the first physical layer device 112 is enabled for narrowband cancellation in accordance with various embodiments. Depending on the embodiment, the first physical layer device 112 can implement one or more of the methods for narrowband cancellation described herein, which can enable the first physical layer device 112 to cancel NBI present in a data signal received at the first physical device 112 from the second physical layer device 122. Though not shown, similar to the first physical layer device 112, the second physical layer device 122 can be enabled for narrowband cancellation in accordance with various embodiments. Accordingly, the second physical layer device 122 can implement one or more of the methods for narrowband cancellation described herein, which can enable the second physical layer device 122 to cancel NBI present in a data signal received at the second physical device 122 from the first physical layer device 112.

Though not illustrated, in certain applications, the first device 102 can be communicatively coupled to one or more other devices (e.g., one or more sensor devices) that generate or otherwise provide the first device 102 with data (e.g., data packets or data frames) that need to be transmitted to the second device 104. Accordingly, via the second physical layer device 122, the second device 122 can transmit the data received from the one or more other devices to the first device 102 (e.g., using a high data rate, such as one based on IEEE 1202.11ch). Depending on the embodiment, the one or more devices can comprise one or more sensors or other peripheral devices that generate or provide video data or radar/lidar data according to a data standard. The first physical layer device 112 of the first device 102 can receive the data from the second device 104. Subsequently, the data received at the first device 102 can be processed by a processor that is part of, or operatively coupled to, the first device 102. For example, the received data can comprise video data from a camera sensor device that can be processed at the first device 102. The processor of the first device 102 can include, without limitation, an electronic control unit (ECU), a central processing unit (CPU), or a graphic processing units (GPU).

Figure 2:
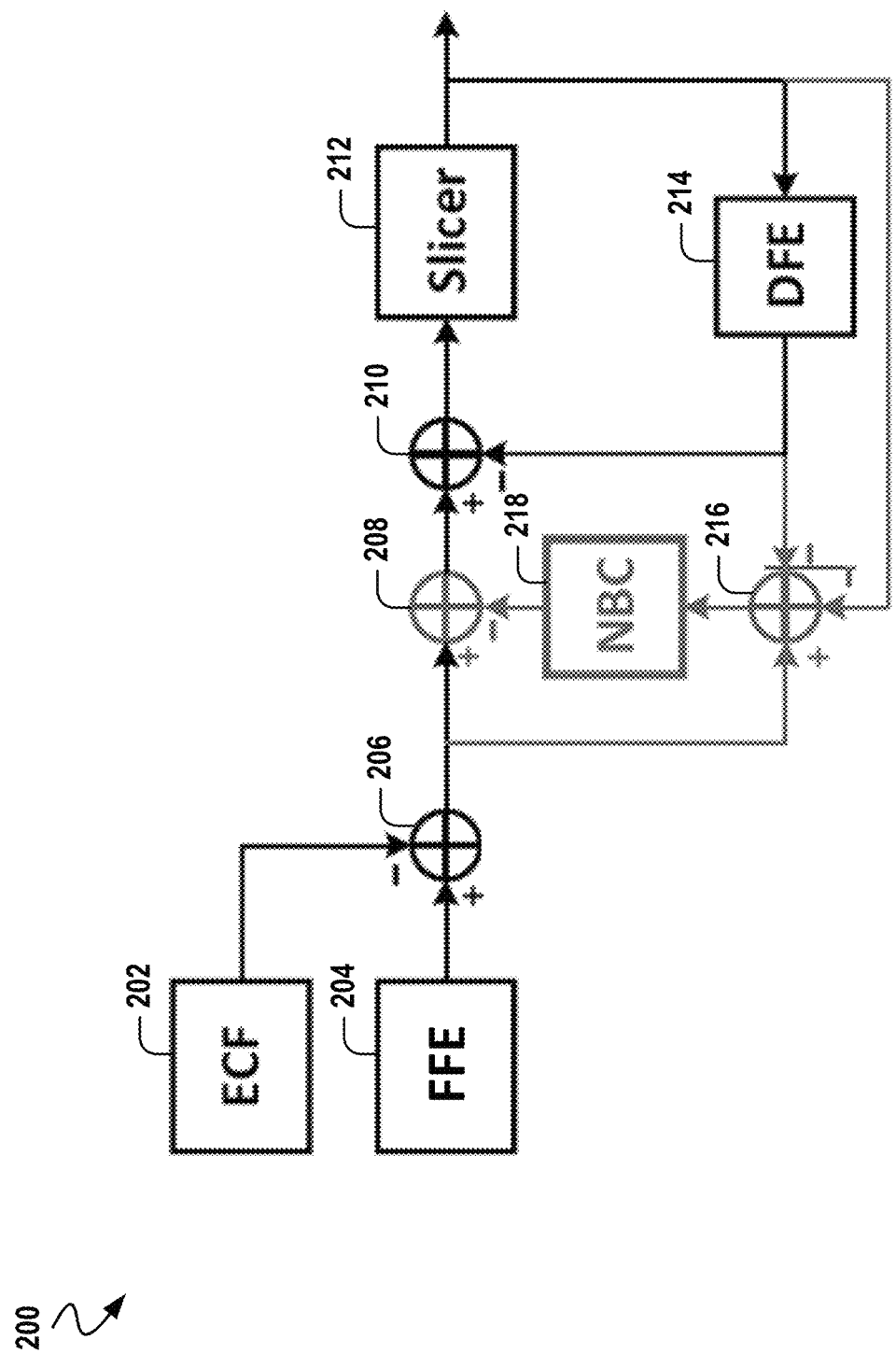
FIG. 2 is a block diagram illustrating an example architecture for a narrowband cancellation in accordance with some embodiments, which can be implemented in a physical (PHY) layer device.

FIG. 2 is a block diagram illustrating an example architecture 200 for a narrowband cancellation in accordance with some embodiments, which can be implemented in a physical (PHY) layer device. For some embodiments, the architecture 200 implements at least a part of the first physical layer device 112, the second physical layer device 122, or both. As shown, the architecture 200 comprises an echo cancellation filter (ECF) 202, a feed-forward equalizer (FFE) 204, combiners 206, 208, 210, 216, a data slicer 212, a decision feedback equalizer (DFE) 214, and a narrowband canceller (NBC) 218. According to various embodiments, the NBC 218 implements narrowband cancellation in accordance with an embodiment described herein. In FIG. 2, an output of the ECF 202 is operatively coupled to a first input of the combiner 206, the FFE 204 is operatively coupled to a second input of the combiner 206. An output of the combiner 206 is operatively coupled to a first input of the combiner 208, and an output of the NBC 218 is operatively coupled to a second input of the combiner 208. The output of the combiner 206 is operatively coupled to a first input of the combiner 216, an output of the data slicer 212 is operatively coupled to a second input of the combiner 216, and an output of the DFE 214 is operatively coupled to a third input of the combiner 216. An output of the combiner 216 is operatively coupled to an input of the NBC 218. An output of the combiner 208 is operatively coupled to a first input of the combiner 210, and the output of the DFE 214 is operatively coupled to a second input of the combiner 210. An output of the combiner 210 is operatively coupled to the data slicer 212, and the output of the data slicer 212 is operatively coupled to an input of the DFE 214.

During operation, each of the ECF 202 and FFE 204 can receive as input a data signal transmitted from one physical. Layer device (e.g., 122) to another physical layer device (e.g., 112) over communication medium (e.g., 106). The FFE 204 can be configured to generate a feed-forward equalized signal based on the data signal, the ECF 202 can be configured to generate an echo cancelled signal generated based on the data signal, and the combiner 206 can be configured to generate an input signal (for narrowband cancellation) by combining the echo cancelled signal and the feed-forward equalized signal. The combiner 208 can be configured to generate a narrowband-cancelled input signal by combining an input signal and a narrowband cancellation signal from the NBC 218. In various embodiments, the narrowband cancellation signal when applied to the input signal can cancel a narrowband signal (e.g., NBI) present in the input signal. The combiner 210 can be configured to generate a slicer input signal by combining the narrowband-cancelled input signal and a decision feedback equalization signal from the DFE 214. The data slicer 212 can function as a data sampler and can be configured to generate a sample signal by sampling the slicer input signal. The DFE 214 can be configured to generate the decision feedback equalization signal based on the sample signal. The combiner 216 can be configured to generate an error sample signal by combining the decision feedback equalization signal, the sample signal, and the input signal. The NBC 218 can be configured to generate the narrowband cancellation signal based on the error sample signal.

For some embodiments, the NBC 218 is configured to collect a set of previous error sample signals (e.g., history of error sample signals) provided by the combiner 216 (e.g., over a period of time), and to generate the narrowband cancellation signal based on the (current) error sample signal and a predicted narrowband interference frequency value, where the predicted narrowband interference frequency value is determined by the NBC 218 based on the set of previous error sample signals. For instance, the NBC 218 comprises an adaptive finite impulse response filter that generates the narrowband cancellation signal by filtering the error sample signal based on the set of previous error sample signals. The adaptive finite impulse response filter can be configured to adjust one or more settings of the adaptive finite impulse response filter based on the set of previous error sample signals. For example, the adjustment of one or more settings of the adaptive finite impulse response filter based on the set of previous error sample signals can comprise determining one or more tap coefficients of the adaptive finite impulse response filter based on the set of previous error sample signals. For some embodiments, adjusting a number of taps enabled for the adaptive finite impulse response filter causes an adjustment to an accuracy of the NBC 218 to determine a predicted narrowband interference frequency value. A number of previous error sample signals collected by the NBC 218 (as part of the set of previous error sample signals) corresponds to a number of taps enabled for the adaptive finite impulse response filter.

For some embodiments, the NBC 218 is configured to generate the narrowband-cancelled input signal based on the error sample signal and a known narrowband frequency value (e.g., a priori knowledge of narrowband frequency value). For some embodiments, knowing the frequency of a narrowband signal can help simplify the structure of the NBC 218.

For some embodiments, the NBC 218 comprises a finite impulse response (FIR) filter that generates the narrowband cancellation signal by filtering the error sample signal based on the known narrowband frequency value. According to some embodiments, coefficients (e.g., tap coefficients) for a plurality of taps of the FIR filter are determined based on the known narrowband frequency value. For some embodiments, the NBC 218 comprises a bandpass filter that is configured to generate a bandpass-filtered signal by filtering the error sample signal based on the known narrowband frequency value, and a finite impulse response filter configured to generate the narrowband-cancelled input signal by filtering the bandpass-filtered signal based on a set of previous bandpass-filtered signals provided by the bandpass filter. An example of this is illustrated and described with respect to FIG. 4. Depending on the embodiment, the bandpass filter can comprise one of a static finite impulse response filter or an infinite impulse response filter.

For some embodiments, the NBC 218 comprises an adaptive finite impulse response filter, and the NBC 218 generates the narrowband-cancelled input signal based on the error sample signal and the known narrowband frequency value by a baseband cancellation approach. For instance, the NBC 218 can demodulate the error sample signal by the known narrowband frequency value to generate a baseline signal. The NBC 218 can filter the baseline signal by a first low pass filter (of the NBC 218) to generate a first filtered signal. The NBC 218 can down sample the first filtered signal to a down-sampled signal. The NBC 218 can filter the down-sampled signal by the adaptive finite impulse response filter to generate a second filtered signal (of the NBC 218). The NBC 218 can up sample the second filtered signal to an up-sampled signal. The NBC 218 can filter the up-sampled signal by a second low pass filter to generate a third filtered signal. Eventually, the NBC 218 can modulate the third filtered signal by the known narrowband frequency value to generate the narrowband cancellation signal. An example of this is illustrated and described with respect to FIG. 5.

For some embodiments, the NBC 218 comprises an adaptive finite impulse response filter, and the NBC 218 generates the narrowband-cancelled input signal based on the error sample signal and the known narrowband frequency value to address very low frequency NBI. For instance, the NBC 218 can filter the error sample signal by a first low pass filter to generate a first filtered signal. The NBC 218 can down sample the first filtered signal to a down-sampled signal. The NBC 218 can filter the down-sampled signal by the adaptive finite impulse response filter to generate a second filtered signal (of the NBC 218). The NBC 218 can up sample the second filtered signal to an up-sampled signal. The NBC 218 can filter the up-sampled signal by a second low pass filter to generate the narrowband cancellation signal. An example of this is illustrated and described with respect architecture 600 of FIG. 6.

For some embodiments, the NBC 218 comprises an adaptive finite impulse response filter, and the NBC 218 generates the narrowband-cancelled input signal based on the error sample signal and the known narrowband frequency value to address very high frequency NBI (e.g., just under and close to Nyquist frequency). For instance, the NBC 218 can generate a modified error sample signal by changing a sign of the error sample signal every other cycle. The NBC 218 can filter the modified error sample signal by a first low pass filter to generate a first filtered signal. The NBC 218 can down sample the first filtered signal to a down-sampled signal. The NBC 218 can filter the down-sampled signal by the adaptive finite impulse response filter to generate a second filtered signal (of the NBC 218). The NBC 218 can up sample the second filtered signal to an up-sampled signal. The NBC 218 can filter the up-sampled signal by a second low pass filter to generate a third filtered signal. The NBC 218 can generate the narrowband cancellation signal by changing a sign of the third filtered signal every other cycle. An example of this is illustrated and described with respect architecture 602 of FIG. 6.

The known narrowband frequency value can be determined by a frequency estimation process. Various types of frequency estimation processes can be used to determine the known narrowband frequency. For instance, the frequency estimation process can comprise the following simple algorithm:

$$x(n) = A\cos(wn + p) \rightarrow \cos(w) = \frac{x(n) + x(n-2)}{2x(n-1)}.$$

The known narrowband frequency value can, for example, correspond to a narrowband interference or a baseline wander present in the input signal.

Figure 3:
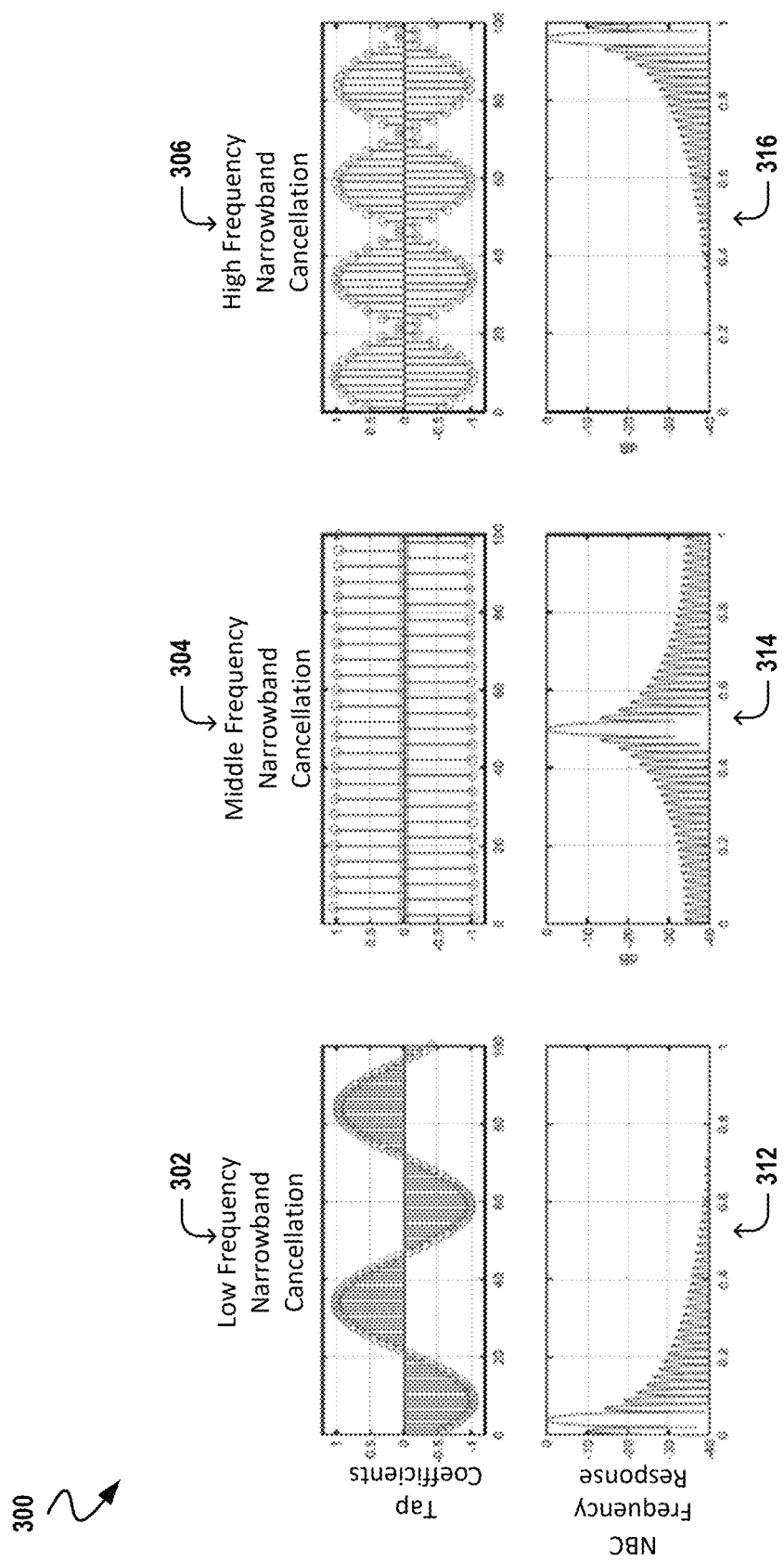
FIG. 3 presents graphs illustrating example profiles for coefficients for taps of a finite impulse response (FIR) filter of a narrowband canceller (NBC), in accordance with some embodiments.

FIG. 3 presents graphs illustrating example profiles for coefficients for taps of a finite impulse response (FIR) filter of a narrowband canceller (NBC), in accordance with some embodiments. In FIG. 3, graphs 302, 304, and 306 represent profiles (e.g., tap profiles) for tap coefficients for a FIR (e.g., adaptive FIR) of an NBC, while graphs 312, 314, and 316 represent the frequency response of the NBC for those profiles respectively. In particular, graph 302 represents a profile that enables the NBC to provide low frequency narrowband cancellation (e.g., of a low frequency NBI), graph 304 represents a profile that enables the NBC to provide mid-frequency narrowband cancellation (e.g., of a mid-frequency NBI), and graph 306 represents a profile that enables the NBC to provide high frequency narrowband cancellation (e.g., of a high frequency NBI). For some embodiments, the max tap is close to one as long as the frequency is not very close to DC or Nyquist frequency. Depending on the embodiment, the profile for tap coefficients can get more complex as the narrowband frequency being cancelled gets very close to DC or Nyquist frequency.

According to some embodiments, an NBC (e.g., 128) is in a feedback loop around a data slicer (e.g., 212), where an error in the data slicer can feedback to the data slicer's input through the NBC, thereby resulting in the creation of error symbols (e.g., more error symbols than those caused by noise in the received signal). To at least reduce the effect of the NBC being a source of error propagation in such embodiments, some embodiments keep the maximum magnitude (of coefficients) of the taps of the FIR filter in the NBC smaller. For instance, the maximum magnitude of the taps can be inversely proportional to the length of the FIR filter. However, where an NBC is providing very low frequency (e.g., close to DC) narrowband cancellation or very high frequency (e.g., close to Nyquist) narrowband cancellation, the FIR filter of the NBC is generally longer.

Having a priori knowledge of the frequency of the narrowband signal to be cancelled by the NBC can simplify the structure of the NBC of some embodiments while diminishing the NBC's robustness. As described herein, there are several frequency estimation processes that can be used to determine the value of the known narrowband frequency. An example of a simplified structure for an NBC is illustrated and described with respect to FIG. 4.

Figure 4:
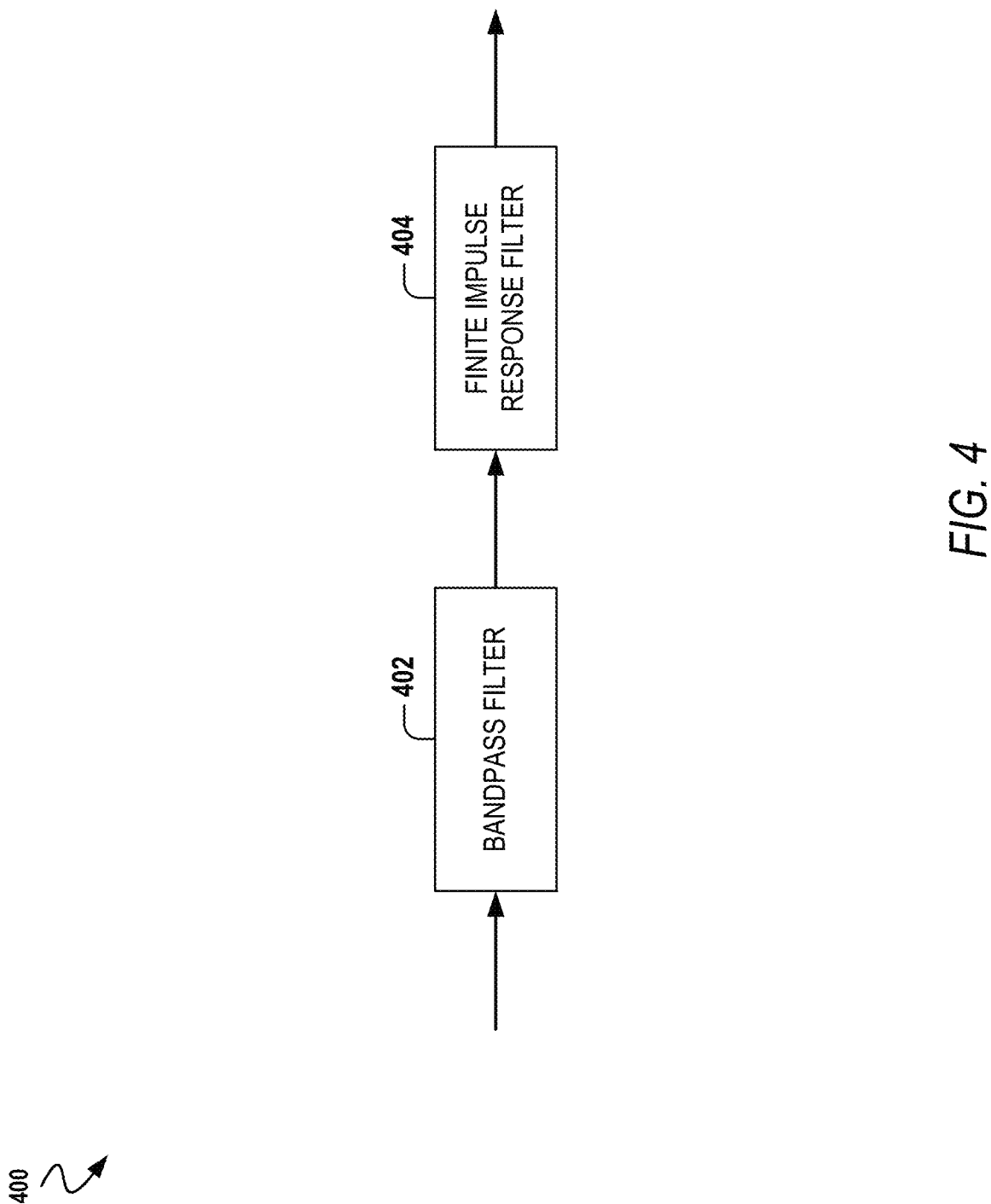
FIG. 4 is a block diagram illustrating an example architecture of a narrowband canceller (NBC) based on a known narrowband frequency, in accordance with some embodiments.

FIG. 4 is a block diagram illustrating an example architecture 400 of a narrowband canceller (NBC) based on a known narrowband frequency, in accordance with some embodiments. As shown, the architecture 400 comprises a bandpass filter (BPF) 402, and a finite impulse response (FIR) filter 404 operatively coupled to an output of the BPF 402. The BPF 402 can comprise an infinite impulse response (IIR) filter (e.g., two tap IIR), or a static FIR (e.g., non-adaptive FIR with 100 taps). A transfer function of the BPF 402 comprising an IIR can be determined based on the known narrowband frequency. For instance, the transfer function can comprise the following formula:

$$\frac{1}{1 - 2a\cos(w)Z^{-1} + a^2 Z^{-2}}$$

where w is the known narrowband frequency (e.g., of an NBI) and a is a constant that controls the bandwidth. The BPF 402 can be implemented a narrower passband filter by cascading multiple BPFs.

The FIR filter 404 can comprise an adaptive FIR, which can be configured to be a short filter (e.g., ten or fewer taps) to control (e.g., adapt) the output gain and phase of the output of the BPF 402. Depending on the embodiment, the tap coefficients of the FIR filter 404 can be determined (e.g., predetermined) based on w and a, and the number of pipeline delays, or can be adaptive to automatically compensate for gain and phase. Alternatively, the FIR filter 404 can comprise a static (e.g., non-adaptive) FIR.

For some embodiments, the architecture 400 is used to implement a baseline wander (BLW) canceller. Alternatively, for some embodiments, the NBC for cancelling a BLW signal comprises a lowpass filter (LPF) (e.g., a leaky integrator with sub-sampling) with unity DC gain. As used herein, a LPF can be implemented using a polyphase structure. A BLW can comprise a very low frequency ISI and echo, which can be generated due to DC notches in coupling circuits (e.g., transformer coupling or capacitive coupling). In particular, the architecture 400 can be used to cancel a BLW signal as another narrowband source, which can be centered around DC.

Figure 5:
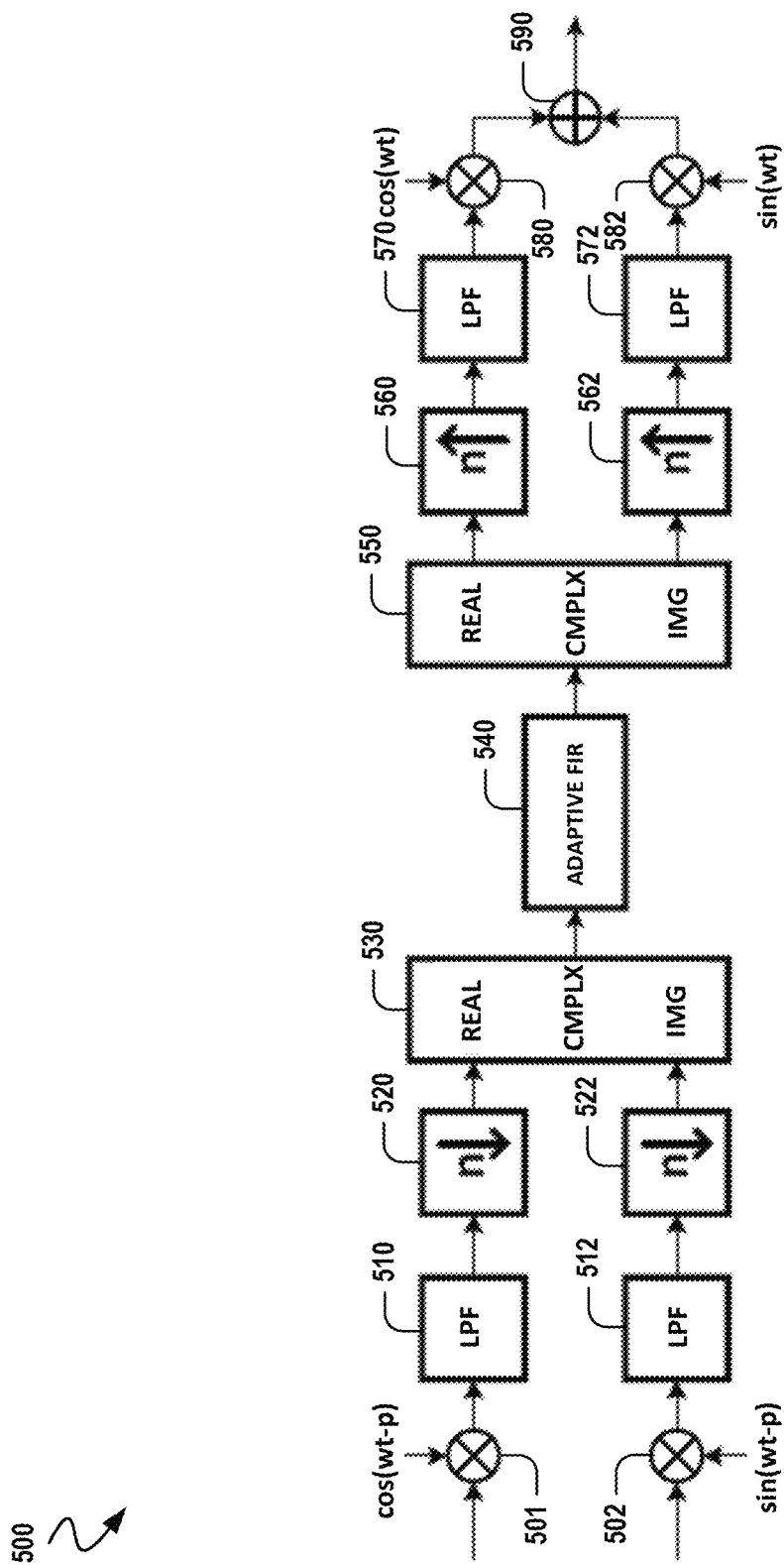
FIG. 5 is a block diagram illustrating an example architecture of a narrowband canceller (NBC) using a known narrowband frequency and demodulation, in accordance with some embodiments.

FIG. 5 is a block diagram illustrating an example architecture 500 of a narrowband canceller (NBC) using a known narrowband frequency and demodulation, in accordance with some embodiments. For some embodiments, the architecture 500 achieves narrowband cancellation by way of baseband cancellation. As shown, the architecture 500 comprises multipliers 501, 502, low pass filters (LPFs) 510, 512, 570, 572, down samplers 520, 522, an adaptive finite impulse response (FIR) filter 540, up samplers 560, 562, and a combiner 590. According to some embodiments, the multiplier 501, the LPF 510, and down sampler 520 represent a signal data path for a real component of an input signal to the NBC. The multiplier 502, the LPF 512, and down sampler 522 represent a signal data path for an imaginary component of the input signal to the NBC. The up sampler 560, the LPF 570, and the multiplier 580 represent a signal data path for a real component of a filtered signal generated by the adaptive FIR 540. The up sampler 562, the LPF 572, and the multiplier 582 represent a signal data path for an imaginary component of the filtered signal generated by the adaptive FIR 540.

During operation of the architecture 500, an input signal (e.g., an error sample signal) to the NBC is down sampled by the known narrowband frequency value to generate a baseline signal. The baseline signal can be filtered by a low pass filter to generate a first filtered signal. The first filtered signal can be down sampled to a down-sampled signal. The down-sampled signal can be filtered by the adaptive finite impulse response filter to generate a second filtered signal. The second filtered signal can be up sampled to an up-sampled signal. The up-sampled signal can be filtered by a second low pass filter to generate a third filtered signal. Eventually, the third filtered signal can be modulated (e.g., remodulated) by the known narrowband frequency value to generate the narrowband cancellation signal, which can be outputted by the NBC.

By demodulating to baseline (by the known narrowband frequency) and down sampling the input signal, the adaptive FIR can filter the resulting signal with less samples. Accordingly, the adaptive FIR can be less complex, can operate on less taps than the adaptive FIRs of NBCs of other embodiments, and can operate on a slower clock (e.g., down sampled clock).

According to some embodiments, an input signal is demodulated by using the multiplier 501 to multiply cos (wt-p), where w represents the known narrowband frequency value, the t represents time, and p represents the phase associated with the delay in the reconstructed signal path The resulting output signal is filtered by the LPF 510 and down sampled by the down sampler 520 to generate a real component of a baseline signal. Similarly, the input signal is demodulated by using the multiplier 502 to multiply sin (wt-p), where w represents the known narrowband frequency value, the t represents time, and p represents the phase associated with the delay in the signal path. The resulting output signal is filtered by the LPF 512 and down sampled by the down sampler 522 to generate an imaginary component of the baseline signal. The real and imaginary signal components provided (at 530) to the adaptive and complex FIR 540 as a complex input, and each is filtered by the adaptive FIR 540 to generate a filtered signal as a complex output. The real and imaginary components of the filtered signal are outputted (at 550) by the adaptive FIR 540. The real component of the filtered signal is up sampled by the up sampler 560, and the resulting output is filtered by the LPF 570 and multiplied (using the multiplier 580) by cos (wt) to generate a real component of the narrowband cancellation signal. The imaginary component of the filtered signal is up sampled by the up sampler 562, and the resulting output is filtered by the LPF 572 and multiplied (using the multiplier 582) by sin (wt) to generate an imaginary component of the narrowband cancellation signal. The real and imaginary components of the narrowband cancellation signal is combined together by the combiner 590 to generate the complete narrowband cancellation signal, which can be outputted by the NBC.

Figure 6:
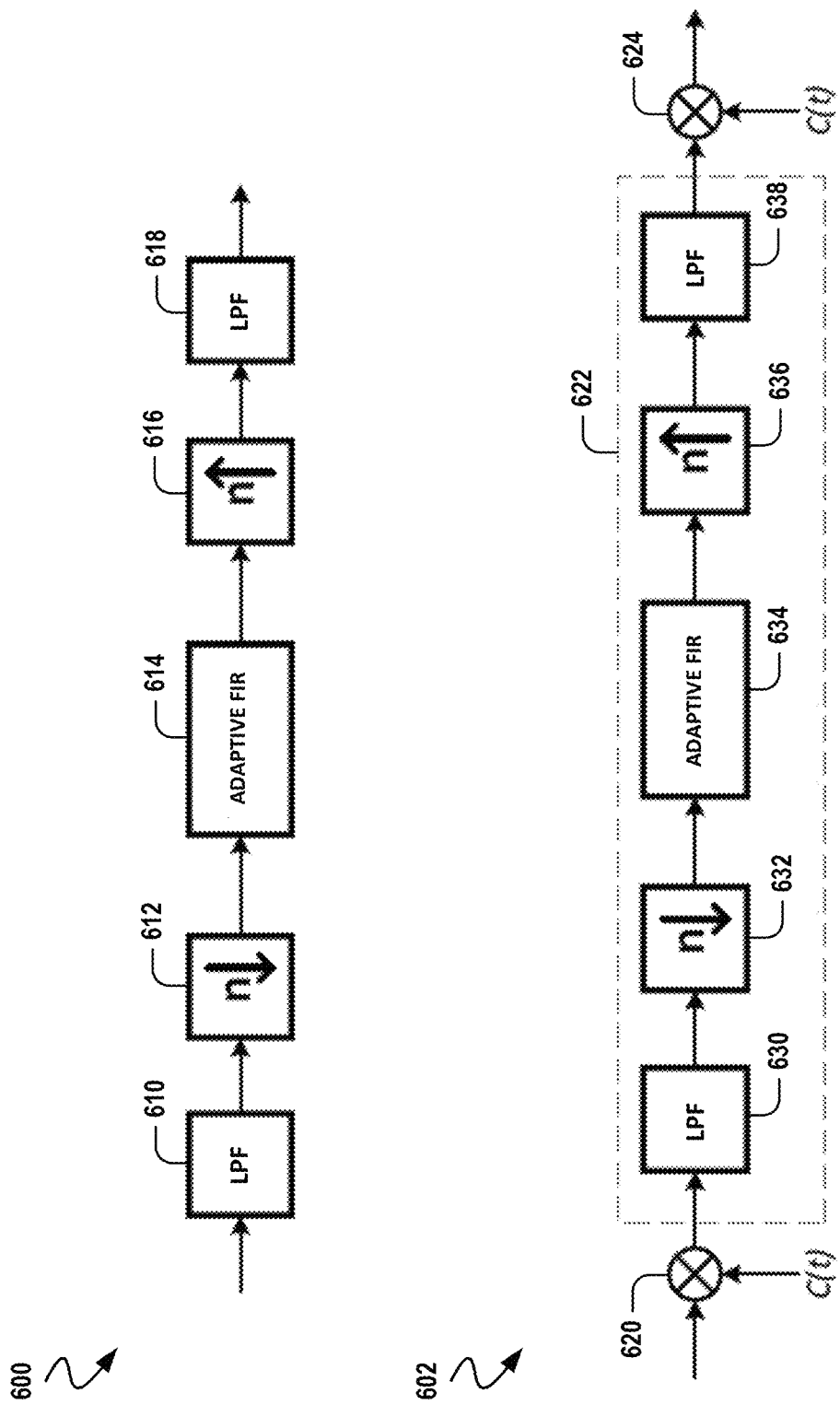
FIG. 6 is a block diagram illustrating example architectures of a narrowband canceller (NBC) for a very low or very high frequency narrowband cancellation, in accordance with some embodiments.

FIG. 6 is a block diagram illustrating example architectures of a narrowband canceller (NBC) for a very low or very high frequency narrowband cancellation, in accordance with some embodiments. For some embodiments, an architecture 600 is configured to provide very low frequency narrowband cancellation (e.g., frequency very close to DC), and an architecture 602 is configured to provide very high frequency narrowband cancellation (e.g., frequency very close to Nyquist). In comparison to the architecture 500 of FIG. 5, demodulation is not used by either the architecture 600 or 602 since the frequency of the narrowband signal is very low or very high.

Referring now to the architecture 600, the architecture 600 comprises a low pass filter (LPF) 610, a down sampler 612, an adaptive finite impulse response (FIR) filter 614, an up sampler 616, and a low pass filter (LPF) 618. During operation, an input signal to the NBC is filtered by the LPF 610 and the filtered signal is further filtered by the adaptive FIR 614. The resulting output is up sampled by the up sampler 616, and the resulting up-sampled signal is filtered by the LPF 618 to generate the narrowband cancellation signal.

Referring now to the architecture 602, the components 622 of the architecture 602 are similarly arranged and operate in a similar manner to those of architecture 600. As shown, the components 622 include a low pass filter (LPF) 630, a down sampler 632, an adaptive finite impulse response (FIR) filter 634, an up sampler 636, and a low pass filter (LPF) 638. The architecture 602 further comprises multipliers 620, 624, which can be used to respectively modify (e.g., change) the sign of an incoming signal to the components 622, and the sign of an outgoing signal generated by the components 622. During operation, an input signal is multiplied by a function C(t) that modifies (e.g., changes or toggles) the sign (e.g., from + to −, and from − to +) of the input signal every other cycle (e.g., every other sample). An output signal generated by the components 622 is multiplied by a function C(t) that modifies (e.g., changes or toggles) the sign (e.g., from + to −, and from − to +) of the output signal every other cycle. Depending on the embodiment, the function C(t) used with the multiplier 620 can be the same as, or different from, the function C(t) used with the multiplier 624. The overall delay of the path can determine whether the functions are the same or different. The modifying (e.g., toggling) of the sign by the multiplier 620 can represent demodulation of the input signal to a low frequency sign with a carrier at Nyquist frequency, and the modifying (e.g., toggling) of the sign by the multiplier 624 can represent modulation (e.g., remodulation) of the output signal to a high frequency sign with the same Nyquist frequency.

Figure 7:
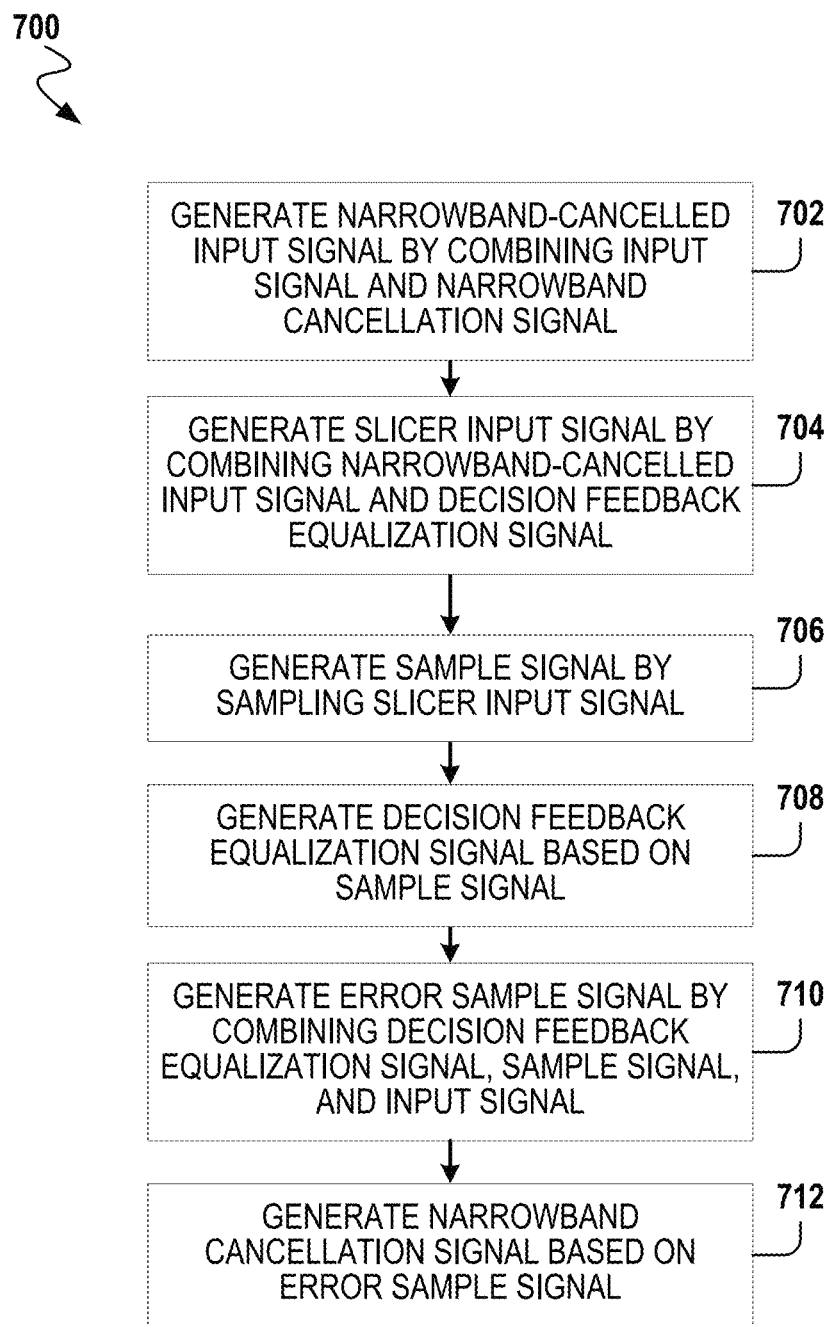
FIGS. 7 and 8 are flowcharts illustrating example methods for narrowband cancellation, in accordance with some embodiments.
Figure 8:
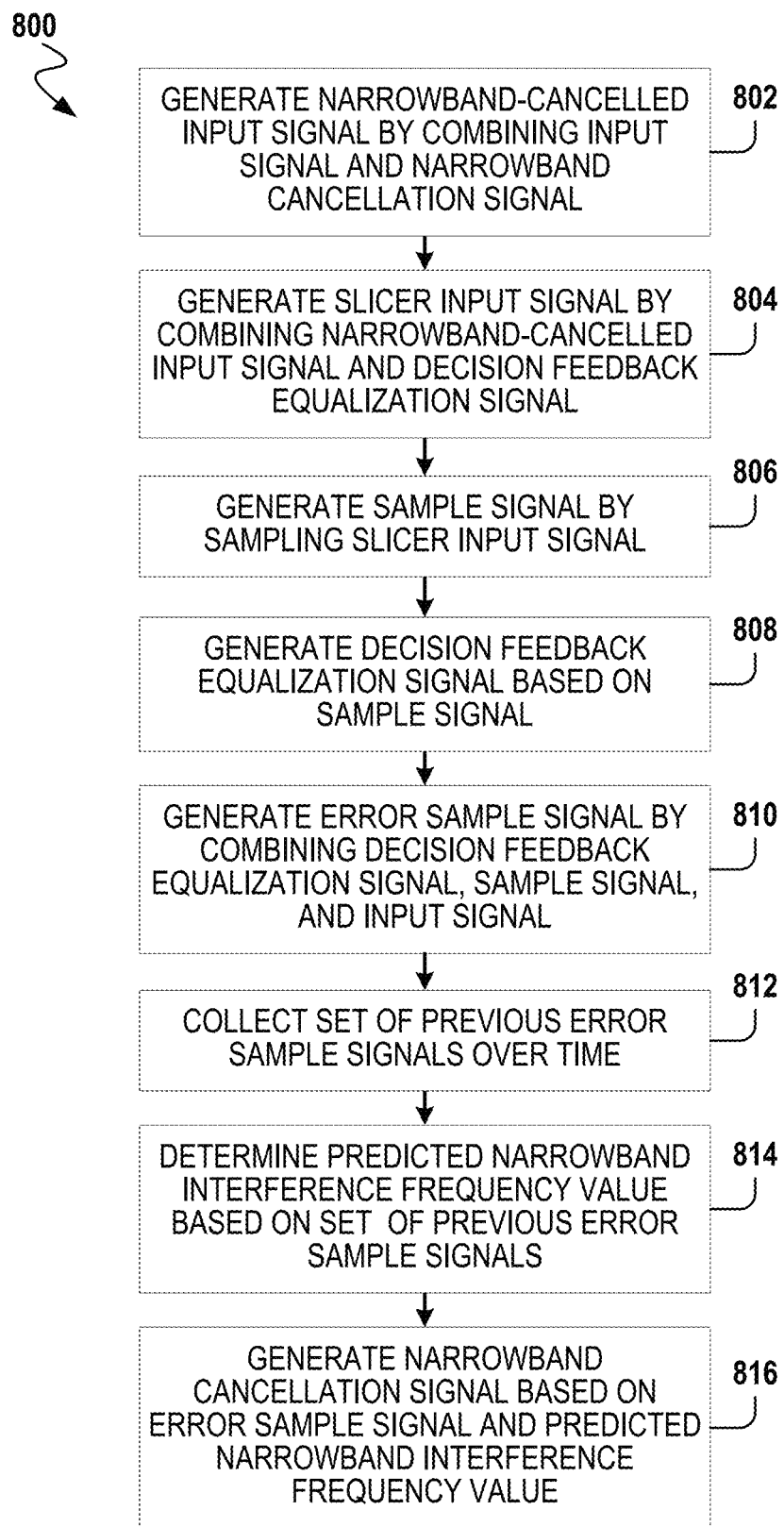

FIGS. 7 and 8 are flowcharts illustrating example methods 700, 800 for narrowband cancellation, in accordance with some embodiments. It will be understood that example methods described herein may be performed by various circuit components, including for example addition circuits, comparators, slicers, digital-to-analog convertors (DAC), analog-to-digital convertors (ADC), delay components, feed-forward equalizers, echo cancellers, crosstalk cancellers, wrap components, precoders, DFEs and the like. For instance, the methods 700, 800 may be performed by the first physical (PHY) layer device 112 or the second physical (PHY) layer device 122 described with respect to FIG. 1. Depending on the embodiment, an operation of an example method described herein may involve intervening operations not shown. Additionally, though the operations of example methods may be depicted and described in a certain order, the order in which the operations are performed may vary among embodiments, including performing certain operations in parallel.

Referring now to FIG. 7, the method 700 can be performed by the architecture 200 of FIG. 2, which can represent the architecture of a first physical layer device (e.g., 112). At operation 702, a first combiner (e.g., 208) generates a narrowband-cancelled input signal by combining an input signal (e.g., outputted by the combiner 206) and a narrowband cancellation signal (e.g., outputted by the NBC 218). The input signal can be based on a data signal transmitted from a second physical layer device (e.g., 122) to the first physical layer device (e.g., 112) over a data transmission medium (e.g., 106). For some embodiments, the input signal is generated by another combiner (e.g., 206) that combines an echo cancelled signal generated by an echo cancellation filter (ECF) (e.g., 202) based on the data (received) signal, and a feed-forward equalized signal generated by a feed-forward equalizer (FFE) (e.g., 204) based on the data (received) signal.

At operation 704, a second combiner (e.g., 210) generates a slicer input signal by combining the narrowband-cancelled input signal (e.g., outputted by the combiner 208) and a decision feedback equalization signal (e.g., outputted by the DFE 214). At operation 706, a data slicer (e.g., 212) generates a sample signal by sampling the slicer input signal (e.g., outputted by the combiner 210). At operation 708, a decision feedback equalizer (e.g., 214) generates the decision feedback equalization signal based on the sample signal (e.g., outputted by the data slicer 212).

At operation 710, a third combiner (e.g., 216) generates an error sample signal by combining the decision feedback equalization signal (e.g., outputted by the DFE 214), the sample signal (e.g., outputted by the data slicer 212), and the input signal. At operation 712, a narrowband canceller (e.g., 218) generates the narrowband cancellation signal based on the error sample signal (e.g., outputted by the combiner 216).

Referring now to FIG. 8, similar to the method 700 of FIG. 7, the method 800 can be performed by the architecture 200 of FIG. 2, which can represent the architecture of a first physical layer device (e.g., 112). According to various embodiments, operations 802, 804, 806, 808, 810 are respectively similar to operations 702, 704, 706, 708, 710 of the method 700 of FIG. 7.

At operation 812, a narrowband canceller (e.g., 218) collets a set of previous error sample signals (e.g., a history of previous error sample signals) provided to the narrowband canceller by the third combiner (e.g., 216) over a period of time. For some embodiments, the number of error sample signal collected is determined by a number of taps enabled for a finite infinite response (FIR) filter that forms part of the narrowband canceller.

At operation 814, the narrowband canceller determines a predicted narrowband interference frequency value based on the set of previous error sample signals. At operation 816, the narrowband canceller generates the narrowband cancellation signal based on a current error sample signal (e.g., outputted by the combiner 216) and the predicted narrowband interference frequency value (determined by the narrowband canceller at operation 814).

FIG. 9 is a block diagram illustrating components of an example machine 900 that can use one or more embodiments discussed herein. Specifically, FIG. 9 shows a diagrammatic representation of the machine 900 in the example form of a system, within which instructions 902 (e.g., software, a program, an application, an applet, an app, a driver, or other executable code) for causing the machine 900 to perform one or more operations that may make use of one or more of the methodologies discussed herein. For example, the instructions 902 include executable code that causes the machine 900 to execute one or more operations that cause a physical (PHY) layer device of the machine 900 (e.g., embodied by communication components 922) to perform the method 700, 800. The machine 900 may be coupled (e.g., networked) to other machines. Depending on the embodiment, the machine 900 can implement at least some portion of the first device 102 or the second device 104.

By way of non-limiting example, the machine 900 may comprise or correspond to a television, a computer (e.g., a server computer, a client computer, a personal computer (PC), a tablet computer, a laptop computer, or a netbook), a personal digital assistant (PDA), a smart phone, a mobile device, or any machine capable of executing the instructions 902, sequentially or otherwise, that specify actions to be taken by the machine 900. Further, while only a single machine 900 is illustrated, the term "machine" shall also be taken to include a collection of machines 900 that individually or jointly execute the instructions 902.

The machine 900 may include processors 904, memory 906, a storage unit 908, and I/O components 910, which may be configured to communicate with each other such as via a bus 912. In some embodiments, the processors 904 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 914 and a processor 916 that may execute the instructions 902. The term "processor" is intended to include multi-core processors 904 that may comprise two or more independent processors (sometimes referred to as "cores") that may execute instructions 902 contemporaneously. Although FIG. 9 shows multiple processors 904, the machine 900 may include a single processor with a single core, a single processor with multiple cores (e.g., a multi-core processor), multiple processors with a single core, multiple processors with multiple cores, or any combination thereof.

The memory 906 (e.g., a main memory or other memory storage) and the storage unit 908 are both accessible to the processors 904 such as via the bus 912. The memory 906 and the storage unit 908 store the instructions 902. The instructions 902 may also reside, completely or partially, within the memory 906, within the storage unit 908, within at least one of the processors 904 (e.g., within the processor's cache memory), or any suitable combination thereof, during execution thereof by the machine 900. Accordingly, the memory 906, the storage unit 908, and the memory of the processors 904 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 902. The term "machine-readable medium" shall also be taken to include any medium, or combination of multiple media, that is capable of storing instructions (e.g., instructions 902) for execution by a machine (e.g., machine 900), such that the instructions, when executed by one or more processors of the machine (e.g., processors 904), cause the machine to perform one or more operations that makes use of one or more of the methodologies described herein (e.g., the method 700, 800). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 910 may include a wide variety of components to receive input, provide output, produce output, transmit information, exchange information, capture measurements, and so on. The specific I/O components 910 that are included in a particular machine 900 will depend on the type of the machine 900. For example, portable machines such as mobile phones will likely include a touch input device or other such input mechanisms, while a headless server machine will likely not include such a touch input device. It will be appreciated that the I/O components 910 may include many other components that are not specifically shown in FIG. 9. The I/O components 910 are grouped according to functionality merely for simplifying the following discussion and the grouping is in no way limiting. In various embodiments, the I/O components 910 may include input components 918 and output components 920. The input components 918 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components, and the like. The output components 920 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 910 may include communication components 922 operable to couple the machine 900 to a network 924 or devices 926 via a coupling 928 and a coupling 930 respectively. For example, the communication components 922 may include a network interface component or another suitable device to interface with the network 924. In further examples, the communication components 922 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 926 may be another machine or any of a wide variety of peripheral devices. According to various embodiments, the communication components 922 can include a transceiver described herein, a receiver described herein, or both.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A physical layer device comprising:
   a first combiner configured to generate a narrowband-cancelled input signal by combining an input signal and a narrowband cancellation signal, the physical layer device being a first physical layer device, the input signal being based on a data signal transmitted from a second physical layer device to the first physical layer device over a data transmission medium;
   a second combiner configured to generate a slicer input signal by combining the narrowband-cancelled input signal and a decision feedback equalization signal;
   a data slicer configured to generate a sample signal by sampling the slicer input signal;
   a decision feedback equalizer configured to generate the decision feedback equalization signal based on the sample signal;
   a third combiner configured to generate an error sample signal by combining the decision feedback equalization signal, the sample signal, and the input signal; and
   a narrowband canceller configured to collect a set of previous error sample signals provided by the third combiner, and to generate the narrowband cancellation signal based on the error sample signal and a predicted narrowband interference frequency value, the predicted narrowband interference frequency value being determined by the narrowband canceller based on the set of previous error sample signals.

2. The physical layer device of claim 1, further comprising:
   an echo cancellation filter configured to generate an echo cancelled signal based on the data signal;
   a feed-forward equalizer configured to generate a feed-forward equalized signal based on the data signal; and
   a fourth combiner configured to generate the input signal by combining the echo cancelled signal and the feed-forward equalized signal.

3. The physical layer device of claim 1, wherein the narrowband canceller comprises an adaptive finite impulse response filter that generates the narrowband cancellation signal by filtering the error sample signal based on the set of previous error sample signals.

4. The physical layer device of claim 3, wherein the adaptive finite impulse response filter being configured to adjust one or more settings of the adaptive finite impulse response filter based on the set of previous error sample signals.

5. The physical layer device of claim 4, wherein the adjusting of the one or more settings of the adaptive finite impulse response filter based on the set of previous error sample signals comprises determining one or more tap coefficients of the adaptive finite impulse response filter based on the set of previous error sample signals.

6. The physical layer device of claim 3, wherein adjusting a number of taps enabled for the adaptive finite impulse response filter causes an adjustment to an accuracy of the narrowband canceller to determine the predicted narrowband interference frequency value.

7. The physical layer device of claim 3, wherein a number of previous error sample signals collected in the set of previous error sample signals corresponds to a number of taps enabled for the adaptive finite impulse response filter.

8. A physical layer device comprising:
   a first combiner configured to generate a narrowband-cancelled input signal by combining an input signal and a narrowband cancellation signal, the physical layer device being a first physical layer device, the input signal being based on a data signal transmitted from a second physical layer device to the first physical layer device over a data transmission medium;
   a second combiner configured to generate a slicer input signal by combining the narrowband-cancelled input signal and a decision feedback equalization signal;
   a data slicer configured to generate a sample signal by sampling the slicer input signal;
   a decision feedback equalizer configured to generate the decision feedback equalization signal based on the sample signal;
   a third combiner configured to generate an error sample signal by combining the decision feedback equalization signal, the sample signal, and the input signal; and
   a narrowband canceller configured to generate the narrowband-cancelled input signal based on the error sample signal and a known narrowband frequency value.

9. The physical layer device of claim 8, wherein the known narrowband frequency value is determined by a frequency estimation process.

10. The physical layer device of claim 8, wherein the narrowband canceller comprises a finite impulse response filter that generates the narrowband cancellation signal by filtering the error sample signal based on the known narrowband frequency value.

11. The physical layer device of claim 10, wherein a plurality of tap coefficients of the finite impulse response filter is determined based on the known narrowband frequency value.

12. The physical layer device of claim 8, wherein the narrowband canceller comprises:

a bandpass filter configured to generate a bandpass-filtered signal by filtering the error sample signal based on the known narrowband frequency value; and a finite impulse response filter configured to generate the narrowband-cancelled input signal by filtering the bandpass-filtered signal based on a set of previous bandpass-filtered signals provided by the bandpass filter.

13. The physical layer device of claim 12, wherein the bandpass filter comprises one of a static finite impulse response filter or an infinite impulse response filter.

14. The physical layer device of claim 12, wherein the known narrowband frequency value corresponds to one of a narrowband interference or a baseline wander present in the input signal.

15. The physical layer device of claim 8, wherein the narrowband canceller comprises an adaptive finite impulse response filter, the narrowband canceller generating the narrowband-cancelled input signal based on the error sample signal and the known narrowband frequency value by:

demodulating the error sample signal by the known narrowband frequency value to generate a baseline signal;

filtering the baseline signal by a first low pass filter to generate a first filtered signal;

down sampling the first filtered signal to a down-sampled signal;

filtering the down-sampled signal by the adaptive finite impulse response filter to generate a second filtered signal;

up sampling the second filtered signal to an up-sampled signal;

filtering the up-sampled signal by a second low pass filter to generate a third filtered signal; and modulating the third filtered signal by the known narrowband frequency value to generate the narrowband cancellation signal.

16. The physical layer device of claim 8, wherein the narrowband canceller comprises an adaptive finite impulse response filter, the narrowband canceller generating the narrowband-cancelled input signal based on the error sample signal and the known narrowband frequency value by:

filtering the error sample signal by a first low pass filter to generate a first filtered signal;

down sampling the first filtered signal to a down-sampled signal;

filtering the down-sampled signal by the adaptive finite impulse response filter to generate a second filtered signal;

up sampling the second filtered signal to an up-sampled signal; and filtering the up-sampled signal by a second low pass filter to generate the narrowband cancellation signal.

17. The physical layer device of claim 8, wherein the narrowband canceller comprises an adaptive finite impulse response filter, the narrowband canceller generating the narrowband-cancelled input signal based on the error sample signal and the known narrowband frequency value by:

generating a modified error sample signal by changing a sign of the error sample signal every other cycle;

filtering the modified error sample signal by a first low pass filter to generate a first filtered signal;

down sampling the first filtered signal to a down-sampled signal;

filtering the down-sampled signal by the adaptive finite impulse response filter to generate a second filtered signal;

up sampling the second filtered signal to an up-sampled signal;

filtering the up-sampled signal by a second low pass filter to generate a third filtered signal; and generating the narrowband cancellation signal by changing a sign of the third filtered signal every other cycle.

18. A method comprising:

generating, by a first combiner of a first physical layer device, a narrowband-cancelled input signal by combining an input signal and a narrowband cancellation signal, the input signal being based on a data signal transmitted from a second physical layer device to the first physical layer device over a data transmission medium;

generating, by a second combiner of the first physical layer device, a slicer input signal by combining the narrowband-cancelled input signal and a decision feedback equalization signal;

generating, by a data slicer of the first physical layer device, a sample signal by sampling the slicer input signal;

generating, by a decision feedback equalizer of the first physical layer device, the decision feedback equalization signal based on the sample signal;

generating, by a third combiner of the first physical layer device, an error sample signal by combining the decision feedback equalization signal, the sample signal, and the input signal; and generating, by a narrowband canceller of the first physical layer device, the narrowband cancellation signal based on the error sample signal.

19. The method of claim 18, wherein the narrowband canceller comprises a finite impulse response filter.

20. The method of claim 18, further comprising:

collecting, by the narrowband canceller, a set of previous error sample signals provided to the narrowband canceller by the third combiner; and determining, by the narrowband canceller, a predicted narrowband interference frequency value based on the set of previous error sample signals, the narrowband canceller generating the narrowband cancellation signal further based on the predicted narrowband interference frequency value.

* * * * *